US005716455A

United States Patent [19]

Zednicek et al.

[11] Patent Number: 5,716,455

[45] Date of Patent: Feb. 10, 1998

[54] PROCESS AND APPARATUS FOR CONTINUOUS SURFACE TREATMENT

[75] Inventors: Michael Zednicek, Vienna; Wilhelm Hofkirchner, Gablitz; Wilhelm Karner, Eichgraben, all of Austria

[73] Assignee: Andritz-Patentverwaltungs-Gesellschaft m.b.H., Graz, Austria

[21] Appl. No.: 543,613

[22] Filed: Oct. 16, 1995

[30] Foreign Application Priority Data

Oct. 17, 1994 [AT] Austria .................................... 1951/94

[51] Int. Cl.$^6$ ............................ C03C 23/00; B08B 1/02; B08B 3/04; C23G 1/02

[52] U.S. Cl. .................................. 134/2; 134/15; 134/34; 134/41; 134/122 R

[58] Field of Search ........................... 205/687; 204/207; 134/15, 122 R, 2, 3, 34, 41

[56] References Cited

U.S. PATENT DOCUMENTS

| | | | |
|---|---|---|---|
| 4,270,317 | 6/1981 | Kurie | 134/64 R X |
| 4,388,169 | 6/1983 | Nagira et al. | 204/207 |
| 4,807,653 | 2/1989 | Cipriano et al. | 134/64 R |
| 4,920,995 | 5/1990 | Seiz et al. | 134/15 |
| 4,996,998 | 3/1991 | Seiz et al. | 134/60 |
| 5,179,967 | 1/1993 | Mattiussi | 134/64 R X |

*Primary Examiner*—Donald R. Valentine

*Attorney, Agent, or Firm*—Alix, Yale & Ristas, LLP

[57] ABSTRACT

A process for continuous surface treatment, in particular for pickling and cleaning of metal strip in a treatment chamber through which the strip runs in a roughly horizontal path and to which a treatment liquid, in particular pickling liquid, is fed. An increased local shearing force is applied between the surface to be treated and the treatment liquid, by passing the strip through a constriction. In addition the invention is directed to a device for implementation of the process, characterized by, in particular, several processing stations such as venturi modules being provided in the treatment chamber which cause an increase in the shearing force between the strip and the treatment liquid.

27 Claims, 8 Drawing Sheets

PROCESS AND APPARATUS FOR CONTINUOUS SURFACE TREATMENT

BACKGROUND OF THE INVENTION

The invention refers to a process for continuous surface treatment, in particular for pickling and cleaning strip, for example, metal and in particular, steel strip, in a treatment chamber through which the strip runs in a roughly horizontal path and to which a treatment liquid, in particular pickling liquid, is supplied. Furthermore, the invention refers to a device for implementing the process.

Various systems am known for surface treatment, particularly pickling, of continuous strip in which the main principle is to feed the strip horizontally through the tank and the treatment medium. The treatment medium, particularly pickling acid, is generally supplied at the entry and exit points of the strip from the treatment chamber. This arrangement also seals off the treatment chamber from the surrounding environment. Treatment medium is also supplied from the sides into the treatment chamber. All of these systems, however, do not provide adequate pickling effect. Thus, a given throughput with appropriate quality requirements usually requires a very long treatment chamber and correspondingly expensive equipment.

SUMMARY OF THE INVENTION

An object of the present invention is to increase the effectiveness of the treatment, particularly for pickling, in order to achieve substantial reductions in the length of equipment and in its cost, as well as to cut the treatment temperature and with it, the operating costs.

This object is achieved according to the invention by the surface to be treated being subjected to a greater shearing force between itself and the treatment liquid at a localized position in the chamber. This increased shearing force, relative to the nominal shearing force arising from the mere transport of the strip through the liquid-filled chamber, diminishes the boundary film of the liquid on the strip surface, resulting in increased pickling effect and a reduction in pickling time.

A preferred feature of the process according to the invention is characterized by fresh treatment liquid, particularly pickling liquid, being added at the point at which increased shearing force is applied and by the treatment liquid being swirled round in this area. The addition of treatment liquid, particularly pickling liquid, directly at the point at which increased shearing force is applied and in the area where the liquid undergoes the most swirling, guarantees that the pickling acid is brought rapidly to the strip, which provides a further boost to the pickling intensity.

A favorable further preferred feature of the invention is characterized by the amount of liquid added being subjected to flow control, such control being applied to the treatment liquid alone or in combination with the quantity. By varying the quantity and/or the temperature of the pickling liquid it is possible to vary the pickling effect to meet the given requirements.

An advantageous implementation of the invention is characterized by the surface to be treated being held in place by the treatment liquid, in particular by being centered in processing stations to increase the shearing force. If the strip is secured, and particularly centered in this way, it avoids coming into contact with the floor of the chamber, thus preventing such contact making scratches in the strip.

The apparatus embodiment of the invention provides continuous surface treatment, in particular for picking and cleaning strip, for example metal, particularly steel strip, in a treatment chamber, where the strip runs through the chamber in a roughly horizontal path, and is primarily characterized by several processing stations being provided in the treatment chamber, in particular a pickling tank, for the purpose of increasing the shearing force between the strip and the treatment liquid. This increased shearing force diminishes the boundary film of the liquid, resulting in increased pickling effect.

A favorable further aspect of the invention is characterized by a processing station which presents a constriction through which the strip passes, e.g., preferably an area with continuously narrowing cross-section when viewed in the strip running direction. With this narrowing cross-section, which can be a module shaped like a venturi tube, for example, the liquid undergoes effective turbulence, thus increasing the pickling intensity. In addition, this type of processing station also centers the strip between the top and bottom of the chamber, in particular also centering the strip in the middle of the venturi module, thus avoiding contact with the floor of the chamber and the scratches on the strip surface that this would otherwise cause.

An advantageous feature of the preferred embodiment is characterized by nozzles for supplying fresh treatment liquid in the vicinity of the processing stations. If treatment liquid is added through nozzles near the processing stations, this causes even greater turbulence in the liquid on the one hand and rapid transport of, in particular, fresh acid to the strip on the other hand, which leads to greater pickling intensity.

A favorable further aspect of the preferred embodiment is characterized by the nozzles being mounted downstream of the processing station, when viewed in strip running direction. Nozzles can alternatively be mounted upstream of or inside the processing station, or in addition to the downstream nozzles. Since the nozzles are mounted downstream of the processing station, the treatment medium is fed to the strip in an area where the liquid is subjected to increased turbulence. Furthermore, the addition of treatment medium through nozzles upstream of the processing station would cause additional turbulence in this area and thus, improved pickling intensity. Nozzles mounted inside the processing station would further its hydrodynamic effect and prevent the strip coming into contact with it, even at low speeds. In particular, a combination of all three arrangements leads to optimum pickling intensity.

An advantageous arrangement is characterized by the nozzles being located underneath the material strip. Alternatively, they can also be located above the strip or both above and below it. The discharge openings in the nozzles can point either in the strip running direction or in the opposite direction to the strip. An additional favorable influence can be exerted on the pickling effect with a suitable location and orientation of the nozzles.

An additional preferred feature is characterized by at least one drainage point being provided for treatment liquid and this drain being connected to nozzles for recycling the treatment liquid to at least one other point in the treatment chamber. This provides an additional acid circulation system which can be used to optimize the pickling efficiency.

Another advantageous feature is characterized by including at least one pump between the drain and the recycling point. By controlling the pump, the amount of circulation medium can be set accordingly and the delivery speed from the nozzles adjusted to achieve optimum pickling effect.

A further design option is characterized by at least one heating device, in particular a heat exchanger, being included between drain and recycling point for the treatment liquid. A heat exchanger mounted in the additional acid circulating system provides an especially effective means of influencing the temperature distribution in the pickling tank, thus permitting, in particular, a substantially even temperature throughout.

BRIEF DESCRIPTION OF THE DRAWINGS

The preferred embodiment of the invention will be described below using examples and reference to the accompanying drawing, in which.

DESCRIPTION OF THE PREFERRED EMBODIMENT

Figure 1:
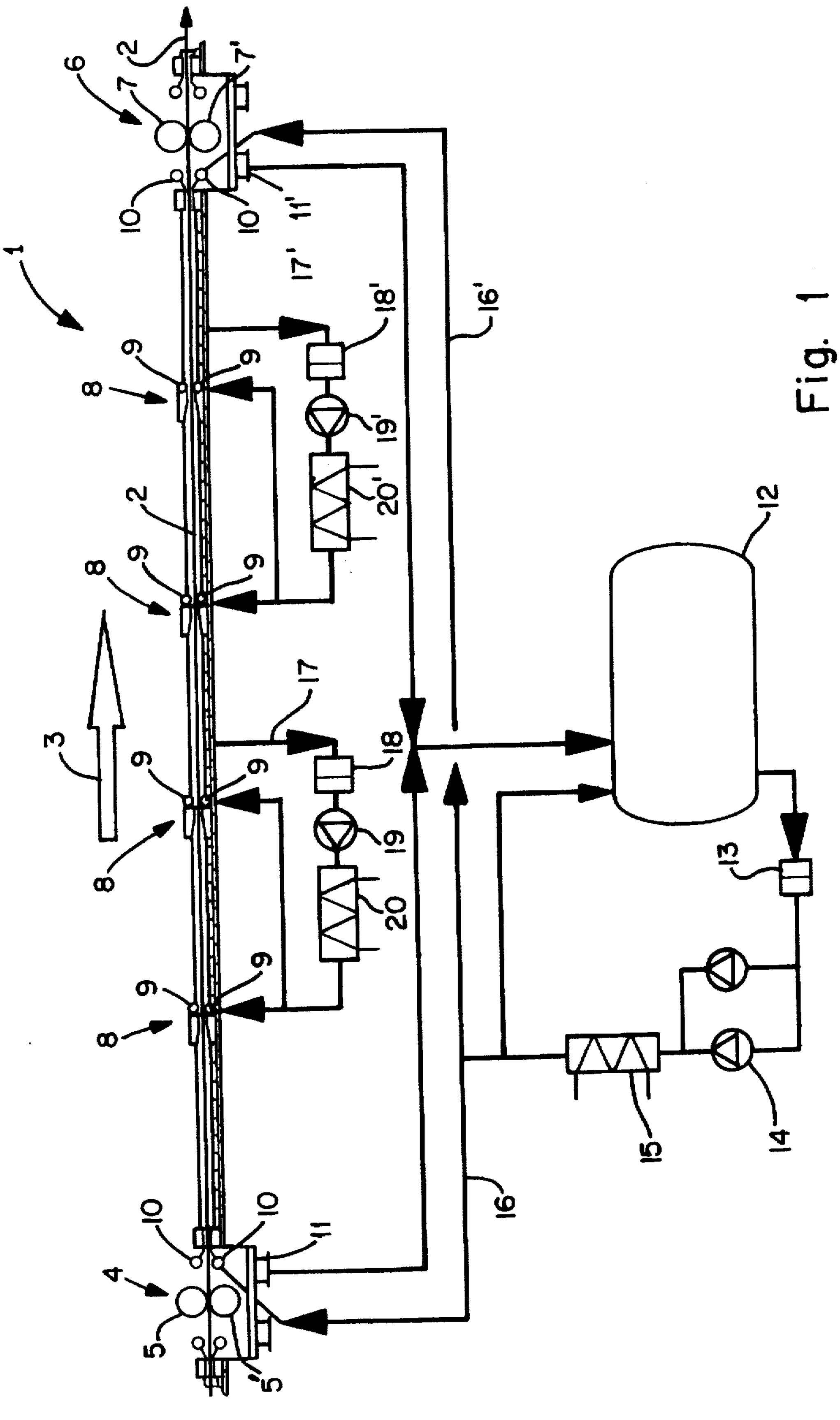
FIG. 1 shows a pickling section according to the invention.

FIG. 1 shows a diagram of a pickling section 1 of a metal surface treatment chamber, which is illustrated without the top cover usually provided in order to give a clearer view of the plant. The steal strip to be pickled 2 moves in direction 3. Beginning at an inlet area 4 with pinch rolls 5,5', the strip is fed through the pickling section 1 to a discharge area 6 with pinch rolls 7 and 7'. This section contains a number of processing stations 8, which will also be referred to as venturi modules. At each of these venturi modules 8 there are nozzles 9 to supply the pickling acid. As a general principle, the pickling acid is fed through a nozzle beam 10 into the pickling section at the entry 4 and/or exit 6 and used pickling acid is recycled to the circulation tank 12 through drains 11,11'. Upon leaving the circulation tank 12, the pickling acid goes through a filter 13 to a pump 14 and from there through a heat exchanger 15, from where it is brought through pipes 16,16' to the nozzle beam 10. In order to gain better control of the pickling process pickling liquid is removed from the pickling section at one or more points 17,17' and fed through a filter 18,18' via a pump 19,19' and through a heat exchanger 20,20' to the nozzles 9.

Figure 2:
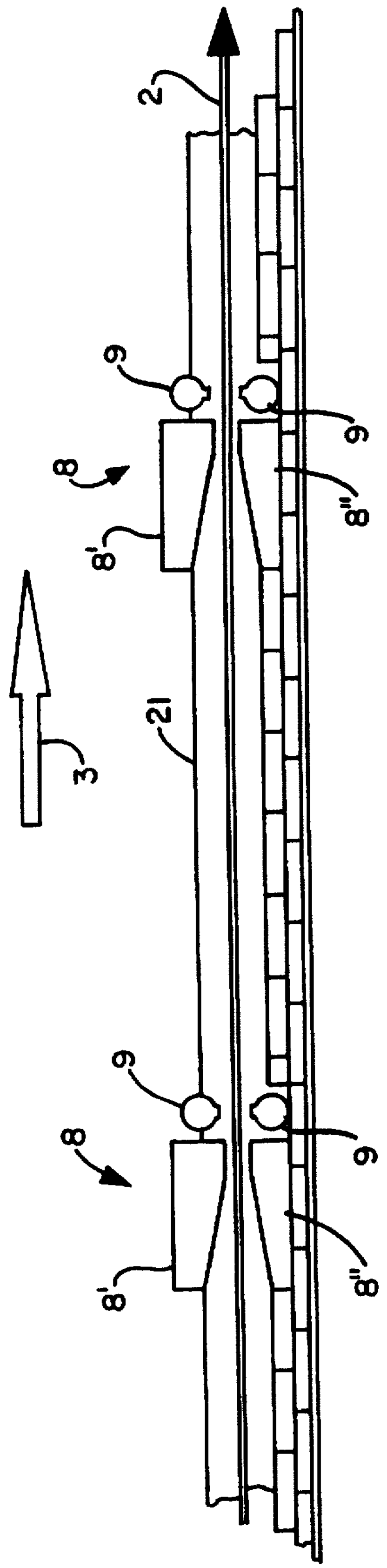
FIG. 2 is an extract from FIG. 1.

FIG. 2 shows an extract from FIG. 1 in which there are two venturi-modules each with a top 8' and bottom section 8". The strip 2 runs in the direction 3 between these two sections 8' and 8" of the venturi modules 8 and is centered horizontally in-order to avoid contact with the floor of the chamber, which would otherwise cause scratches on the strip 2. Nozzles 9 are provided in the area behind the venturi modules 8 for spraying the pickling acid onto the strip in running direction. The acid level is marked 21.

Figure 2A:
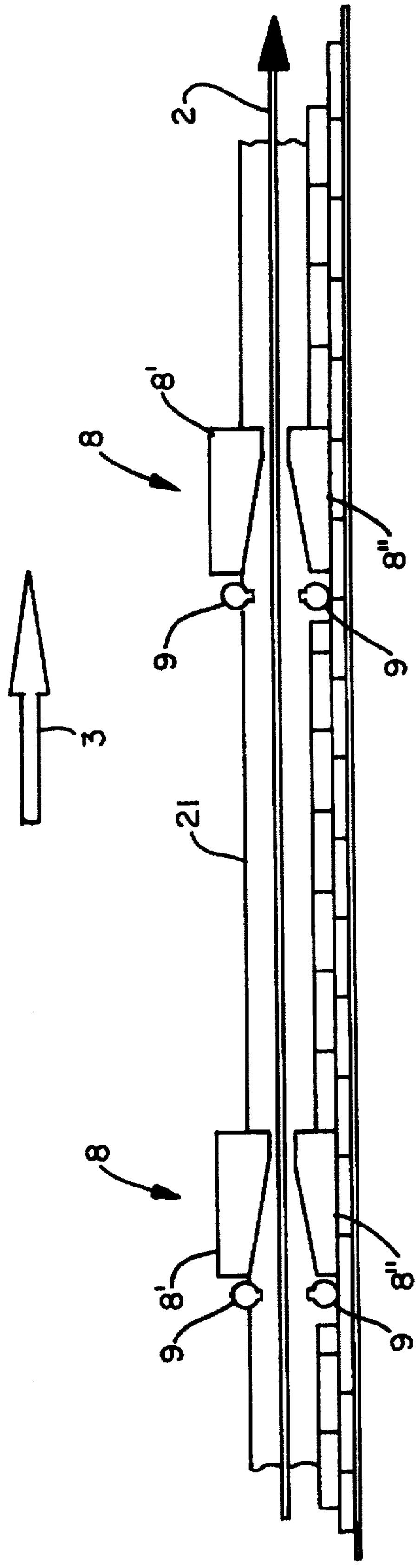
FIGS. 2A, 2B and 3 show an analogous extract from FIG. 1
Figure 2B:
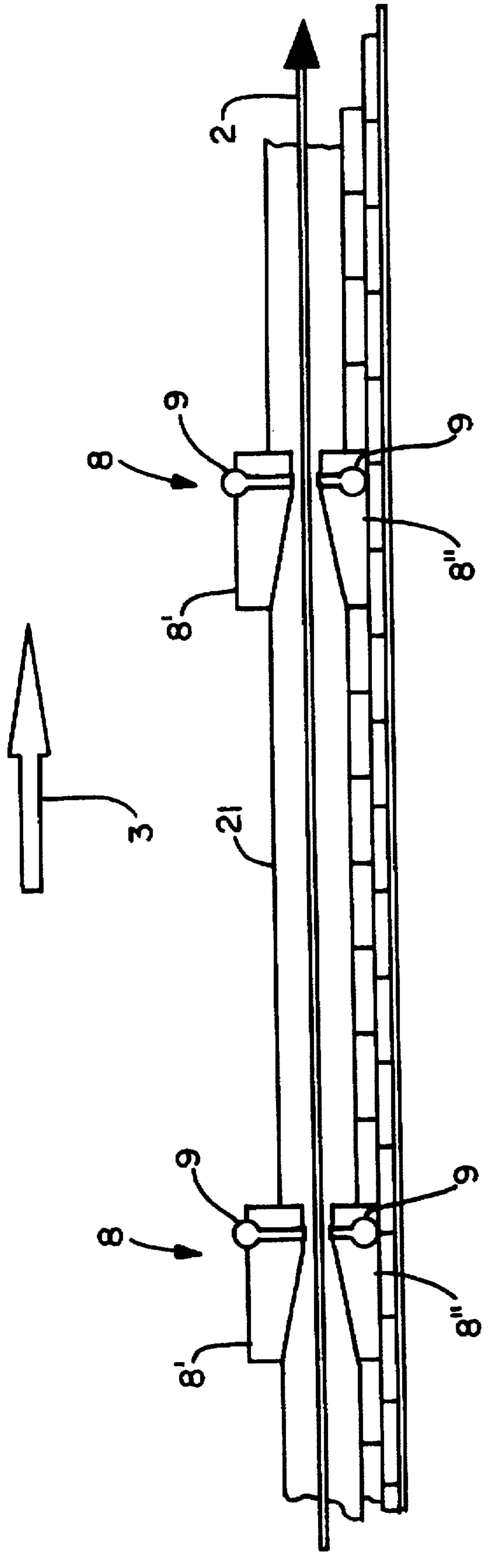
Figure 3:
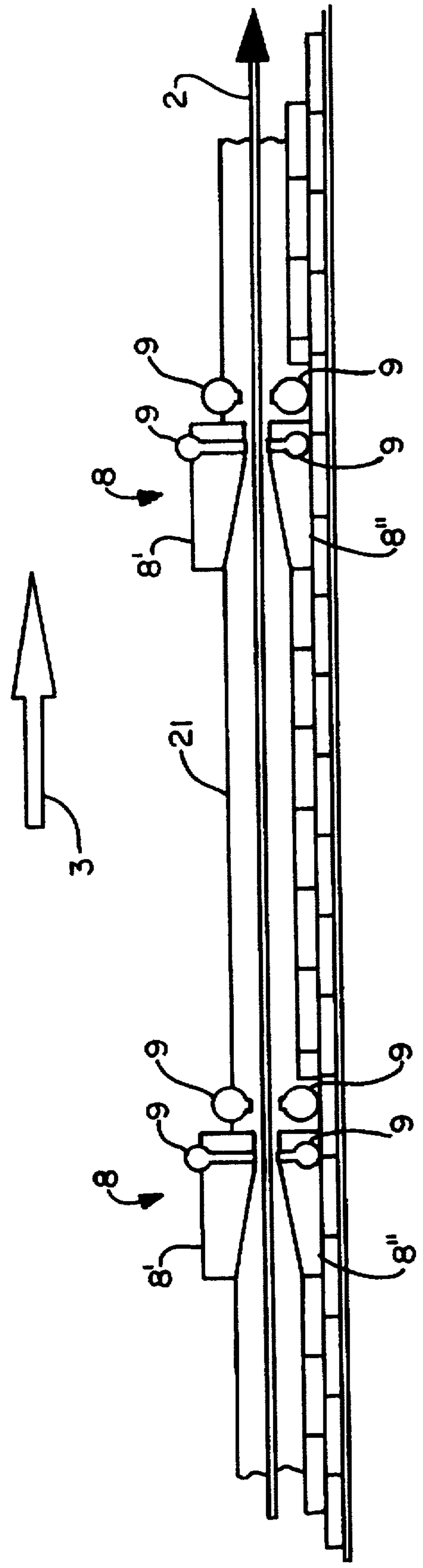

FIGS. 2*a* and 2*b* show an analogous section from FIG. 1, however the difference here relative to FIG. 2 is that the nozzles 9 are mounted upstream of and inside the venturi modules 8 relative to the running direction 3 of the metal strip 2. As a basic principle these variants can also be combined, as the example in FIG. 3 shows, with the nozzles delivering liquid both in the strip running direction 3 and in the opposite direction to the strip. By differing the distribution of pickling liquid flowing out on the underside and the top side of the strip 2, it is possible to set the position of the metal strip 2 in the venturi module 8.

Figure 4A:
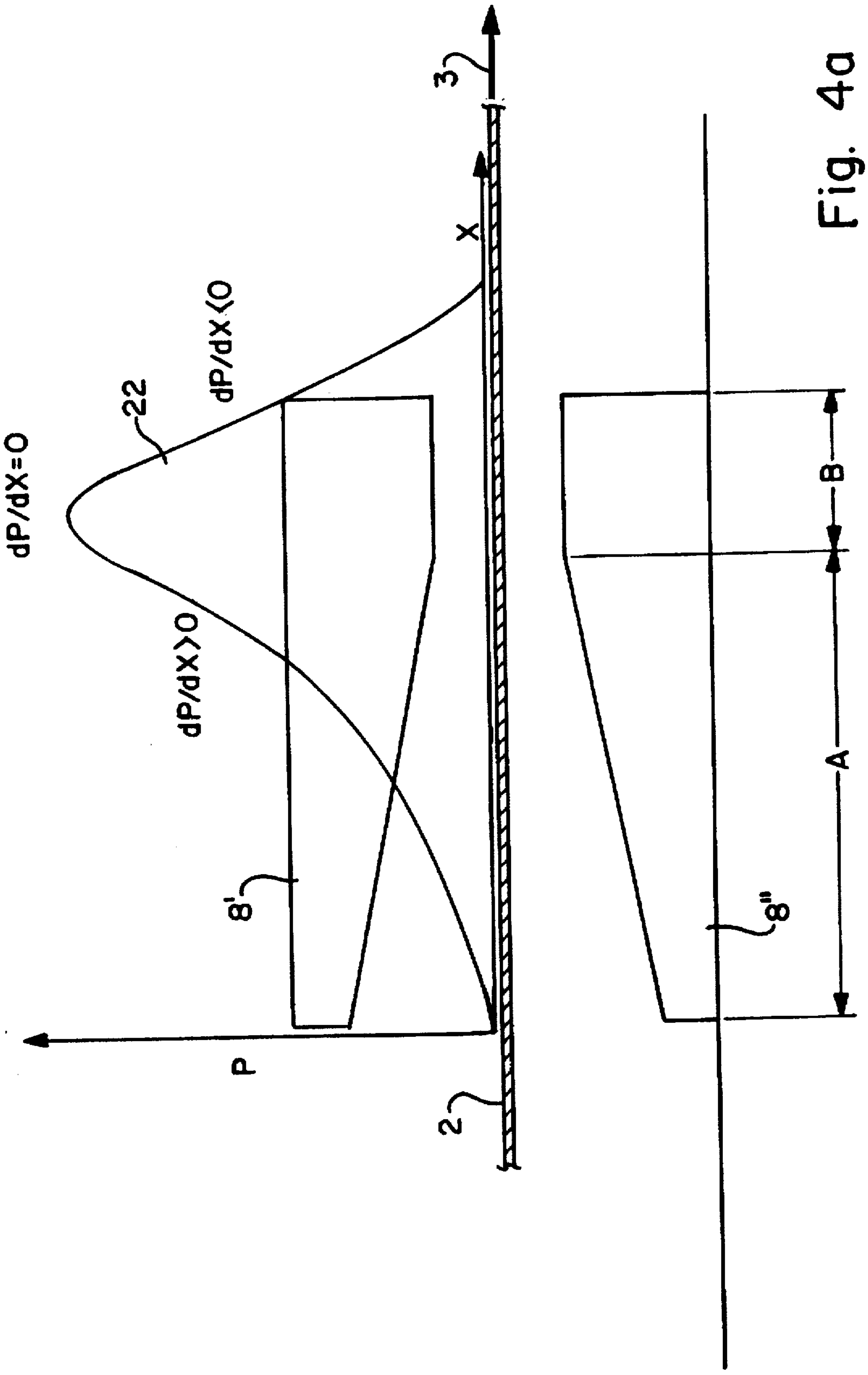
FIG. 4 illustrates the pressure distribution at a processing station in accordance with the preferred embodiment of the invention.
FIG. 4*b* indicates the fluid velocity distribution at the processing station of FIG. 4.

FIG. 4*a* shows the fluid pressure distribution 22 in section A of the narrowing cross section between the top 8' and bottom section 8" of the venturi module 8. The constriction tapers symmetrically along section A and then has a shorter follower section B of uniform height. The pressure increases after entering the venturi module 8 and reaches its maximum level approximately at the end of this section A, at which point it begins to drop again and is eliminated completely in the area just after the venturi module 8. Since the pressure curve in the venturi module 8 is vertically symmetrical along the full horizontal width of the strip, the strip 2 is held in a central position in the middle of the venturi module 8.

Figure 4B:
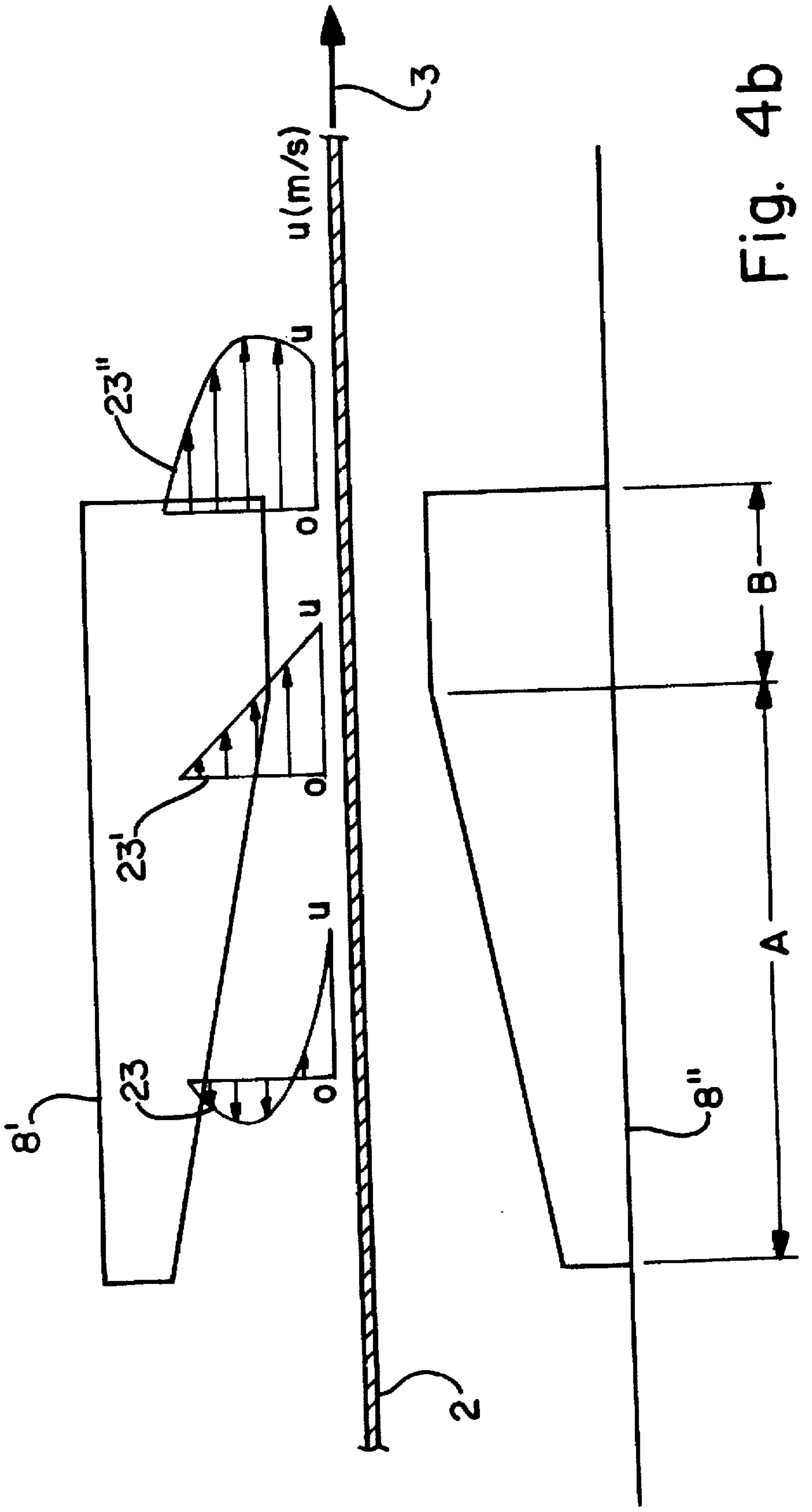

FIG. 4*b* shows the fluid velocity distribution analogous to FIG. 4*a* in a venturi module 8. Due to the tapering cross section in section A of the venturi module 8, the acid accelerates from a velocity profile 23 to a profile 23' and up to a profile of 23".

Figure 5:
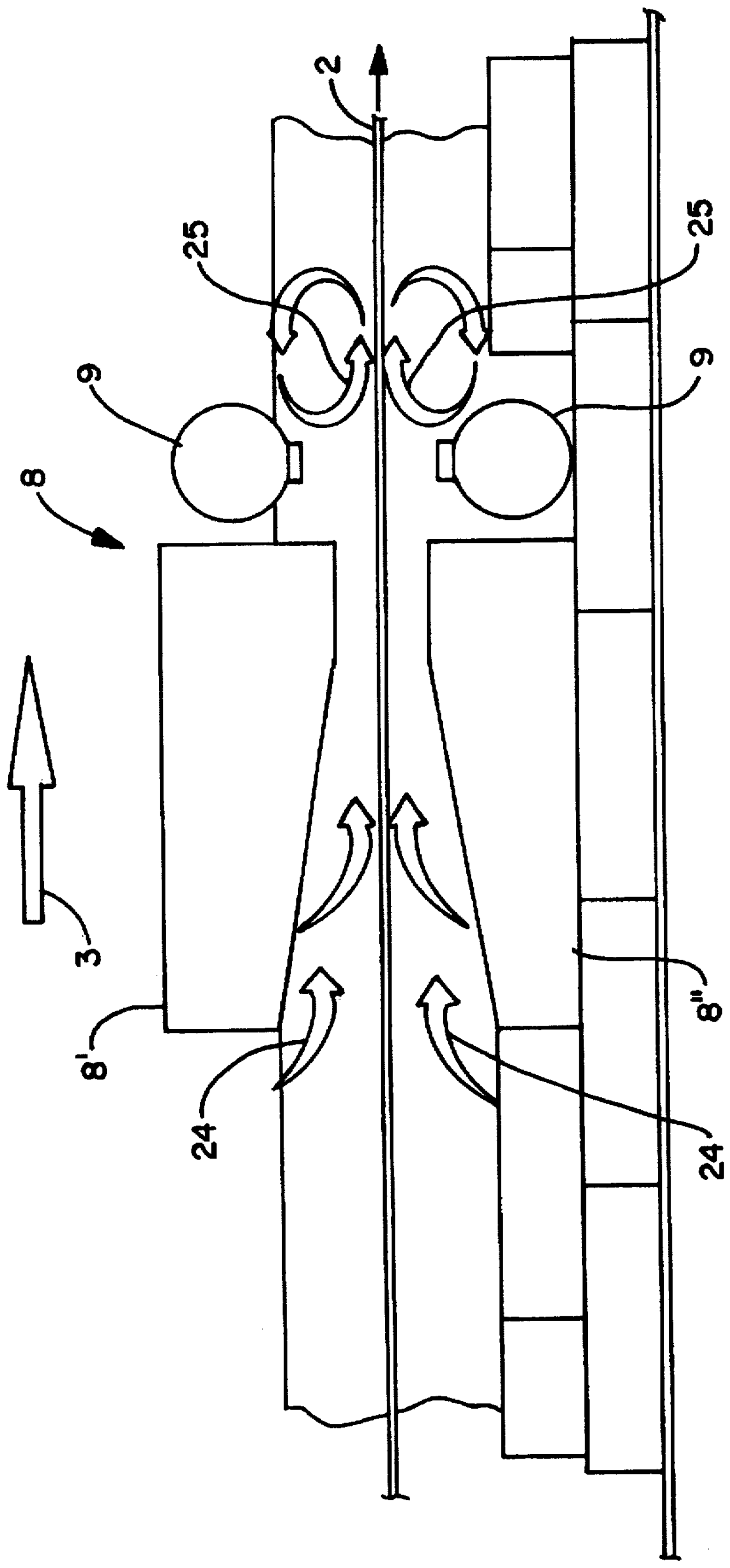
FIG. 5 shows the fluid flow direction at the processing station of FIG. 4.

FIG. 5 shows the flow conditions in a venturi module 8, with the flow direction 24 marked at the inlet to the venturi module 8 and a turbulent eddy current 25 visible at the outlet from the module 8. This component of the eddy current 25 is moving counter-clockwise toward the strip. Fresh treatment medium is fed in through the nozzles 9, into this flow guaranteeing that the fresh acid is transported rapidly by the eddy turbulence to the strip and thus, increasing the pickling intensity.

The invention is not restricted to the designs illustrated. In particular the discharge of the nozzles can face in the strip running direction 3 or in the opposite direction to the strip. Similarly, a covering hood can be mounted over the pickling section. In addition, several separate pickling acid circulating systems can be included within one single pickling section or several pickling sections can be arranged one after the other.

We claim:

1. A process for continuous surface treatment of a metal strip in a treatment chamber where the strip runs through a bath of pickling liquid, so as to create a nominal shear force between the surface to be treated and the liquid in the bath, while pickling liquid is fed to the chamber, wherein the improvement comprises increasing the shear force between the surface to be treated and the treatment liquid, relative to the nominal shear force, at a plurality of localized positions in said chamber by passing the strip through a respective plurality of constrictions in said chamber, whereby the liquid experiences a pressure gradient in the strip running direction within each constriction, said pressure gradient increasing monotonically in the strip running direction to a maximum within the constriction.

2. The process according to claim 1, wherein fresh treatment liquid is fed into the chamber, at the position at which the shear force is increased.

3. The process according to claim 2, wherein the feeding of the fresh treatment liquid at said position, is controlled to vary the quantity of treatment liquid in accordance with the desired treatment effect on the strip.

4. The process according to claim 2, wherein the fresh liquid fed into said chamber, is controlled to vary the temperature of the fresh liquid in accordance with the desired effect on the strip.

5. The process according to claim 1, wherein the increased shear force results in turbulent eddy flow which impinges on the strip.

6. The process according to claim 5, including the step of introducing fresh treatment liquid into the turbulent eddy flow.

7. The process according to claim 1, wherein the strip runs horizontally through the chamber, the chamber includes a processing station defining said constriction, and the vertical position of the surface to be treated is set by a pressure balance of the treatment liquid against said strip.

8. The process according to claim 7, wherein the surface to be treated is centered in the constriction of the processing station.

9. The process according to claim 1, wherein the fresh liquid is introduced at a location immediately before the strip enters the constriction.

10. The process according to claim 1, wherein the fresh liquid is introduced at a location within the constriction.

11. The process according to claim 1, wherein the fresh liquid is introduced at a location immediately after the strip exits the constriction.

12. Apparatus for continuously treating the surface of a metal strip by pickling, comprising:

a chamber containing a bath of pickling liquid through which the strip runs in a substantially horizontal path, thereby giving rise to a nominal shear force between the liquid and the surface of the strip; and a plurality of processing stations in the chamber along said path, each station including means defining a constriction which continuously narrows in the strip running direction, for generating additional shear force between the strip and the pickling liquid.

13. The apparatus according to claim 14, including nozzle means for providing a supply of fresh treatment liquid at each processing station.

14. The apparatus according to claim 13, wherein the nozzle means are located downstream of said constriction, when viewed in the strip running direction.

15. The apparatus according to claim 14, wherein the nozzle means are located upstream of said constriction, when viewed in the strip running direction.

16. The apparatus according to claim 13, wherein at least some of the nozzle means are located under the strip.

17. The apparatus according to claim 16, wherein some of said nozzle means are located above the strip.

18. The apparatus according to claim 13, wherein at least some of the nozzle means are located above the strip.

19. The apparatus according to claim 13, wherein the nozzle means have openings pointing in the strip running direction.

20. The apparatus according to claim 13, wherein the nozzle means have openings pointing in the opposite direction to the strip running direction.

21. The apparatus according to claim 12, including at least one drain provided for removal of the treatment liquid from the chamber, said drain being connected to nozzles in the chamber for recycling the treatment liquid back to at least one point in the chamber.

22. The apparatus according to claim 21, further including at least one pump situated between the drain and said point in the chamber.

23. The apparatus according to claim 22, further including at least one heat exchanger situated between the drain and said point, for increasing the temperature of the recycled liquid.

24. The apparatus of claim 12, wherein each station includes a first section constituting said means defining a constriction which continuously narrows in the strip running direction, and a second section of uniform cross section which forms a continuation of said first section.

25. The apparatus according to claim 24, including nozzle means located within said second section, for providing a supply of fresh treatment liquid.

26. The apparatus according to claim 25, including additional of said nozzle means located downstream of said constriction when viewed in the strip running direction.

27. The apparatus according to claim 25, including additional of said nozzle means located upstream of said constriction, when viewed in the strip running direction.

* * * * *